(12) United States Patent
Takeda et al.

(10) Patent No.: US 12,560,472 B2
(45) Date of Patent: Feb. 24, 2026

(54) RUBBING POSITION IDENTIFICATION DEVICE AND RUBBING POSITION IDENTIFICATION METHOD FOR ROTATING MACHINE

(71) Applicant: MITSUBISHI HEAVY INDUSTRIES, LTD., Tokyo (JP)

(72) Inventors: Hiroki Takeda, Tokyo (JP); Satoshi Kumagai, Tokyo (JP); Ryo Kawabata, Tokyo (JP); Shuichi Ishizawa, Tokyo (JP); Masahiko Yamashita, Yokohama (JP); Yoshinori Tanaka, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 236 days.

(21) Appl. No.: 18/285,330

(22) PCT Filed: Mar. 30, 2022

(86) PCT No.: PCT/JP2022/016099
§ 371 (c)(1),
(2) Date: Oct. 2, 2023

(87) PCT Pub. No.: WO2022/215630
PCT Pub. Date: Oct. 13, 2022

(65) Prior Publication Data
US 2024/0192047 A1 Jun. 13, 2024

(30) Foreign Application Priority Data
Apr. 8, 2021 (JP) ................................. 2021-065608

(51) Int. Cl.
*G01H 1/00* (2006.01)
*F01D 21/00* (2006.01)

(52) U.S. Cl.
CPC ........... *G01H 1/003* (2013.01); *F01D 21/003* (2013.01); *F05D 2200/11* (2013.01);
(Continued)

(58) Field of Classification Search
CPC ........ G01H 1/003; G01H 1/12; F01D 21/003; F01D 21/04; F05D 2200/11;
(Continued)

(56) References Cited

U.S. PATENT DOCUMENTS 4,377,947 A 3/1983 Matsushita et al.
2018/0284758 A1* 10/2018 Cella ...................... H02M 1/12
(Continued)

FOREIGN PATENT DOCUMENTS

EP 3 054 292 A1 8/2016
EP 3193156 A1 7/2017
(Continued)

OTHER PUBLICATIONS

International Search Report dated Jun. 7, 2022, issued in counterpart International Application No. PCT/JP2022/016099, with English Translation. (6 pages).
(Continued)

*Primary Examiner* — Timothy P Graves
(74) *Attorney, Agent, or Firm* — WHDA, LLP

(57) ABSTRACT

The present invention relates to a rubbing position identification device for a rotating machine provided with a fixed part and a rotating part. This device is provided with an AE sensor, an axial vibration sensor and a rubbing position identification unit. In the case of rubbing occurring in the rotating machine, the rubbing position identification unit calculates the AE phase, which corresponds to the peak of an envelope determined on the base of change over time in the AE signal detected by the AE sensor, and the axial vibration phase, which corresponds to the high spot position of the (Continued)

SHAFT VIBRATION PHASE θvib (POINT AT WHICH AMPLITUDE OF SHAFT VIBRATION SIGNAL IS MAXIMUM)
AE PHASE θrub (POINT AT WHICH ENVELOP Lh of AE SIGNAL IS MAXIMUM)
SHAFT VIBRATION SIGNAL
Δθ
TIME
0
AE SIGNAL
Lh
TIME
0 rotating part specified on the basis of the change over time in the axial vibration signal detected by the axial vibration sensor, and, on the basis of the phase difference between these, identifies the circumferential-direction position of where rubbing has occurred in the rotating machine.

10 Claims, 11 Drawing Sheets

(52) U.S. Cl.
CPC ...... *F05D 2200/12* (2013.01); *F05D 2220/31* (2013.01); *F05D 2260/80* (2013.01); *F05D 2270/80* (2013.01)

(58) Field of Classification Search
CPC ............ F05D 2200/12; F05D 2220/31; F05D 2260/80; F05D 2270/80; F05D 2270/81; G01M 13/045; G01M 99/00
See application file for complete search history.

(56) References Cited

U.S. PATENT DOCUMENTS

| | | | |
|---|---|---|---|
| 2018/0313403 A1 | 11/2018 | Kamiya | |
| 2019/0113081 A1 | 4/2019 | Higashiyama et al. | |
| 2020/0182684 A1* | 6/2020 | Yoskovitz | G01R 33/02 |
| 2021/0140928 A1 | 5/2021 | Kumagai et al. | |

FOREIGN PATENT DOCUMENTS

| | | | | |
|---|---|---|---|---|
| JP | 52-67379 A | 6/1977 | | |
| JP | 54-162585 A | 12/1979 | | |
| JP | 56-72316 A | 6/1981 | | |
| JP | 57-161513 A | 10/1982 | | |
| JP | 62-126320 A | 6/1987 | | |
| JP | 63-179222 A | 7/1988 | | |
| JP | 7-182035 A | 7/1995 | | |
| JP | 2003-177080 A | 6/2003 | | |
| JP | 2009-36624 A | 2/2009 | | |
| JP | 2016-145712 A | 8/2016 | | |
| JP | 2017-214862 A | 12/2017 | | |
| JP | 2019-074113 A | 5/2019 | | |
| JP | 2021-76533 A | 5/2021 | | |
| WO | WO-2016039086 A1 * | 3/2016 | | G01M 99/00 |

OTHER PUBLICATIONS

Office Action dated Dec. 11, 2025, issued in counterpart KR Application No. 10-2023-7031895, with English translation. (11 pages).

* cited by examiner

SHAFT VIBRATION PHASE $\theta$ vib (POINT AT WHICH
AMPLITUDE OF SHAFT VIBRATION SIGNAL IS MAXIMUM)

AE PHASE $\theta$ rub (POINT AT WHICH ENVELOP Lh of AE
SIGNAL IS MAXIMUM)

SHAFT
VIBRATION
SIGNAL $\Delta\theta$

0     → TIME

AE SIGNAL

Lh

0     → TIME

FIRST DIRECTION
(ATTACHMENT DIRECTION
OF FIRST SHAFT
VIBRATION SENSOR 20a)

VERTICAL

SECOND DIRECTION
(ATTACHMENT DIRECTION
OF SECOND SHAFT
VIBRATION SENSOR 20b)

Fo

K(Ph)

$\theta$ rub

HORIZONTAL

O'

NORMAL DIRECTION Dh

Ls

Pr $\phi$ vib1          $\phi$ vib2

20a(20)

20b(20)

4

K

1

O

2

Pc

O'

NORMAL DIRECTION Dh

FIG. 12

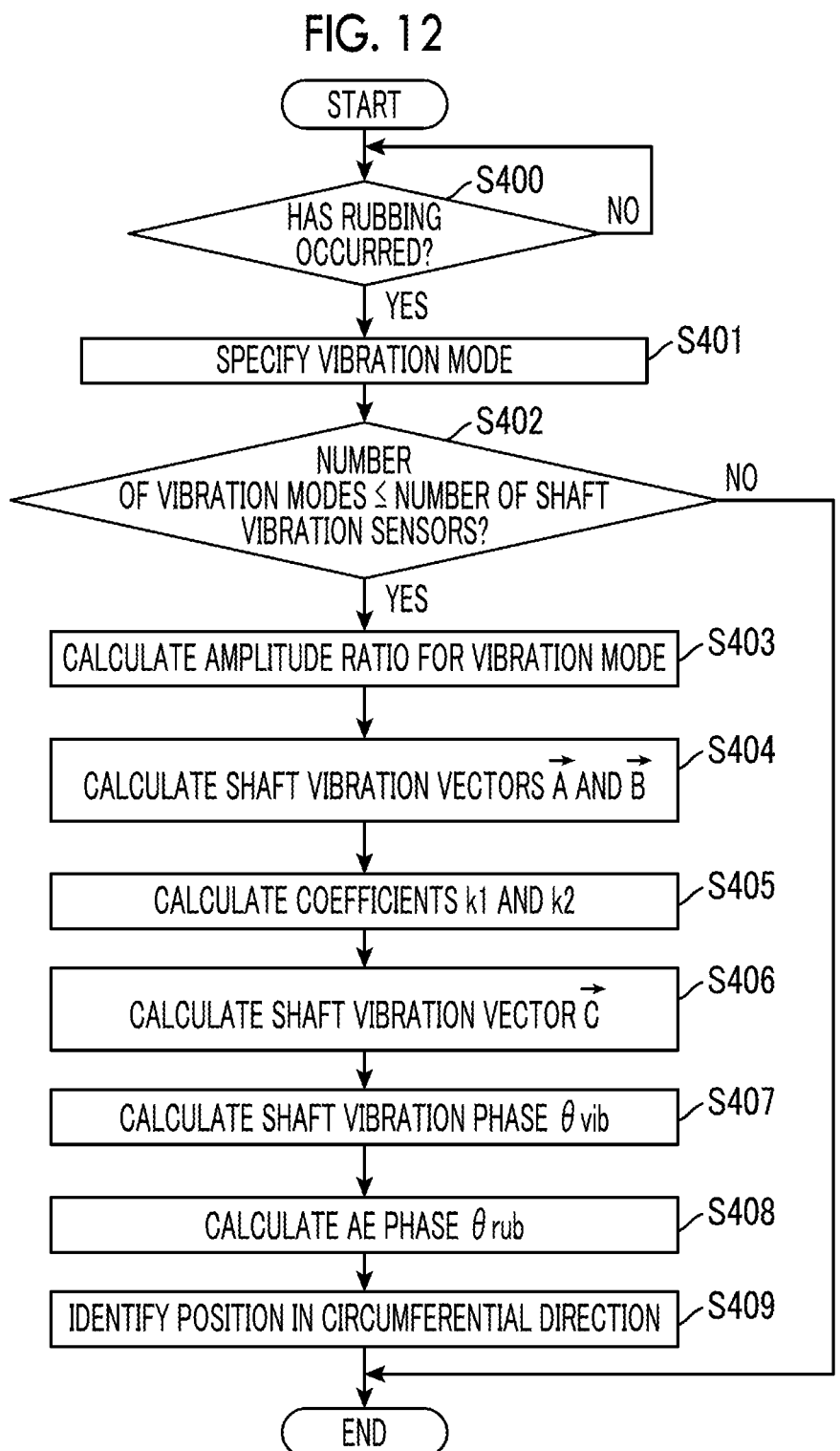

START

S400
HAS RUBBING OCCURRED?    NO

YES

SPECIFY VIBRATION MODE    S401

S402
NUMBER OF VIBRATION MODES ≤ NUMBER OF SHAFT VIBRATION SENSORS?    NO

YES

CALCULATE AMPLITUDE RATIO FOR VIBRATION MODE    S403

CALCULATE SHAFT VIBRATION VECTORS $\vec{A}$ AND $\vec{B}$    S404

CALCULATE COEFFICIENTS k1 AND k2    S405

CALCULATE SHAFT VIBRATION VECTOR $\vec{C}$    S406

CALCULATE SHAFT VIBRATION PHASE $\theta_{vib}$    S407

CALCULATE AE PHASE $\theta_{rub}$    S408

IDENTIFY POSITION IN CIRCUMFERENTIAL DIRECTION    S409

END

RUBBING POSITION IDENTIFICATION DEVICE AND RUBBING POSITION IDENTIFICATION METHOD FOR ROTATING MACHINE

TECHNICAL FIELD

The present disclosure relates to a rubbing position identification device and a rubbing position identification method for a rotating machine.

The present application claims priority based on Japanese Patent Application No. 2021-065608 filed in Japan on Apr. 8, 2021, the contents of which are incorporated herein by reference.

BACKGROUND ART

In the related art, rubbing detection in a rotating machine has been performed by detecting shaft vibration of a rotary shaft. The shaft vibration in the rotary shaft may be generated by rubbing (scraping) between a seal or the like and the rotary shaft due to thermal deformation of a casing and by causing thermal bending of the rotary shaft due to heat generated by the rubbing. The occurrence of such rubbing causes shaft vibration of the rotating machine and degradation in performance due to deterioration of the seal. In addition, since the shaft vibration of the rotary shaft is a phenomenon that can be detected at a stage at which rubbing has progressed to the extent that thermal bending occurs in a rotor, in a case where rubbing is detected by the shaft vibration, there is a concern that it is necessary to take measures that have a significant influence on an operation of the rotating machine, such as emergency stopping of the rotating machine. Thus, early detection of rubbing is desired.

As a method for solving such a problem, a rubbing detection technique using an acoustic emission (AE) sensor capable of detecting an AE signal is known. The AE sensor is easy to attach, and rubbing can be detected at an earlier stage than in a case based on shaft vibration of the related art by detecting the AE signal based on contact sound of a rotating body. Accordingly, the AE sensor is regarded as promising. For example, PTL 1 discloses a technique for providing a plurality of AE sensors along a circumferential direction with respect to a rotary shaft and identifying a rubbing occurrence position in the circumferential direction by processing AE signals detected by these AE sensors.

CITATION LIST

Patent Literature

[PTL 1] Japanese Unexamined Patent Application Publication No. 2016-145712

SUMMARY OF INVENTION

Technical Problem

In the above PTL 1, since it is necessary to install the plurality of AE sensors for the rotating machine, the number of AE sensors increases and the cost increases. In addition, since rubbing in a cross section in which the plurality of AE sensors are disposed is targeted for detection, it is difficult to detect rubbing in a case where rubbing occurs at a position in an axial direction different from the cross section. In addition, since the rubbing detection is performed based on a minute phase difference between the plurality of AE sensors due to the rubbing, there is a possibility that it is difficult to detect the rubbing due to an influence of noise included in the AE signal.

At least one embodiment of the present disclosure has been made in view of the above circumstances, and an object thereof is to provide a rubbing position identification device and a rubbing position identification method for a rotating machine capable of identifying a rubbing position in a circumferential direction with a simple configuration.

Solution to Problem

A rubbing position identification device of a rotating machine according to at least one embodiment of the present invention is a rubbing position identification device for a rotating machine that includes a fixed part and a rotating part. The device includes at least one AE sensor for detecting an AE signal of the rotating machine, at least one shaft vibration sensor for detecting a shaft vibration signal of the rotating part, and a rubbing position identification unit for identifying a position of a rubbing occurrence location of the rotating machine in a circumferential direction based on a difference between an AE phase corresponding to a peak of an envelope specified based on a temporal change of the AE signal and a shaft vibration phase corresponding to a high spot position of the rotating part specified based on a temporal change of the shaft vibration signal in a case where rubbing has occurred in the rotating machine.

A rubbing position identification method of a rotating machine according to at least one embodiment of the present invention is a rubbing position identification method of a rotating machine that includes a fixed part and a rotating part. The method includes a step of detecting an AE signal of the rotating machine, a step of detecting a shaft vibration signal of the rotating part, and a step of identifying a position of a rubbing occurrence location of the rotating machine in a circumferential direction based on a difference between an AE phase corresponding to a peak of an envelope specified based on a temporal change of the AE signal and a shaft vibration phase corresponding to a high spot position of the rotating part specified based on a temporal change of the shaft vibration signal in a case where rubbing occurs in the rotating machine.

Advantageous Effects of Invention

According to at least one embodiment of the present disclosure, it is possible to provide the rubbing position identification device and the rubbing position identification method for a rotating machine capable of identifying the rubbing position in the circumferential direction with a simple configuration.

BRIEF DESCRIPTION OF DRAWINGS

FIG. 12 is a flowchart illustrating another rubbing position identification method that can be performed by the rubbing position identification device of FIG. 9.

DESCRIPTION OF EMBODIMENTS

Figure 1:
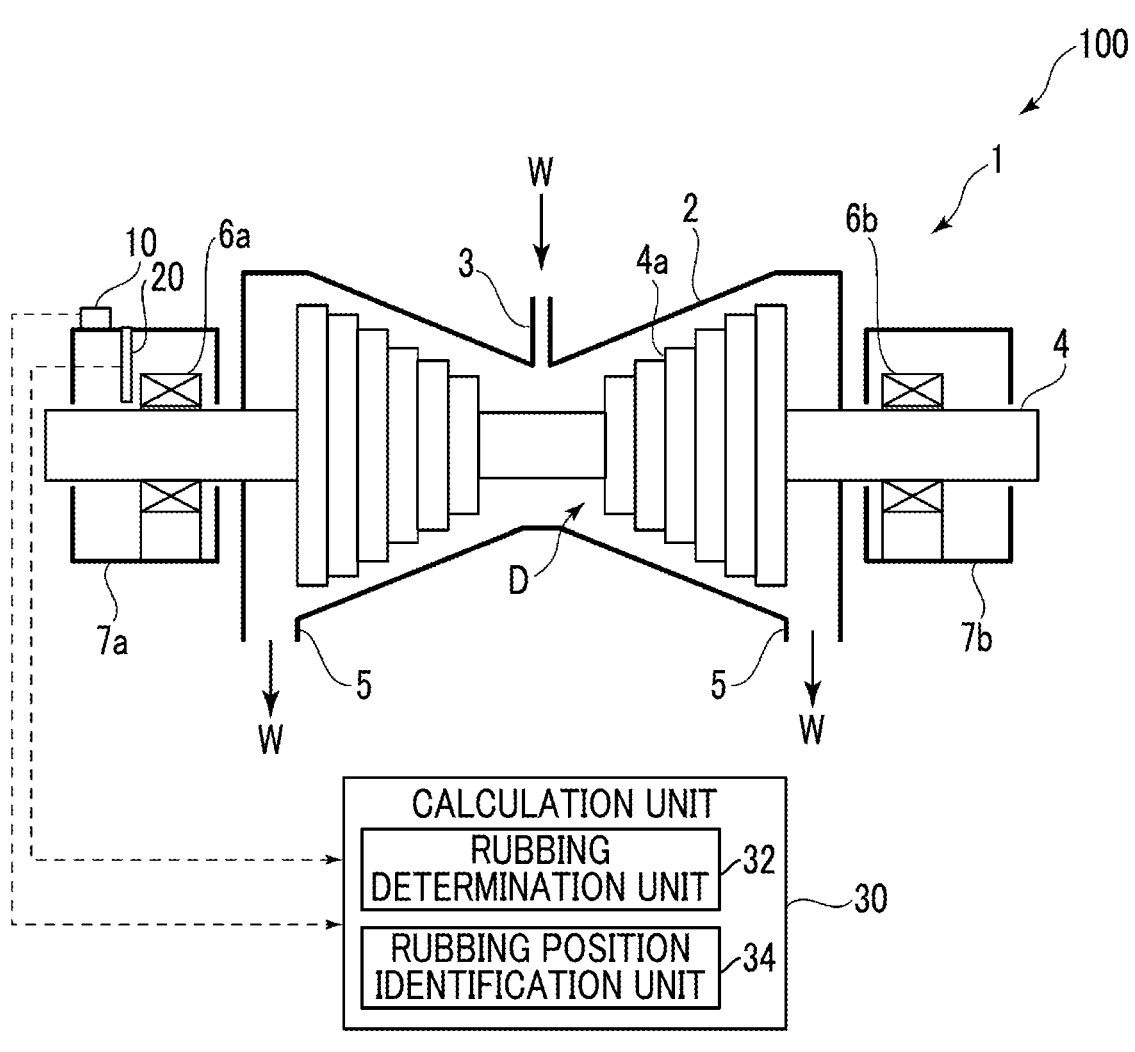
FIG. 1 is a cross-sectional structure diagram of a rotating machine according to an embodiment.

Hereinafter, some embodiments of the present disclosure will be described with reference to the accompanying drawings. Dimensions, materials, shapes, relative arrangements, and the like of components described as embodiments or illustrated in the drawings are not intended to limit the scope of the present disclosure, but are merely explanatory examples.

FIG. 1 is a cross-sectional structure diagram of a rotating machine 1 according to an embodiment. The rotating machine 1 includes a stationary part 2 and a rotating part 4 that is rotatable with respect to the stationary part 2. The stationary part 2 is a casing of the rotating machine 1 and is stationary with respect to an outside. The rotating part 4 is rotatably supported with respect to the stationary part 2 via a pair of bearings 6a and 6b.

A clearance D is provided between the stationary part 2 and the rotating part 4. The rotating part 4 is driven by a hydraulic fluid W being supplied to the clearance D from a supply system 3 provided in the stationary part 2. The hydraulic fluid W that drives the rotating part 4 is discharged to the outside from a discharge part 5 provided in the stationary part 2. During an operation of the rotating machine 1, at least one of the stationary part 2 or the rotating part 4 is deformed due to the influence of heat or the like, and thus, the clearance D may be reduced, and rubbing may occur. Such rubbing can be detected based on an AE signal detected by an AE sensor 10 to be described later.

The rotating part 4 is, for example, a rotor (rotary shaft) rotatable by power generated by the hydraulic fluid W. The rotating part 4 has a rotor blade 4a for receiving the hydraulic fluid W, and the rotating part 4 is rotationally driven by receiving the hydraulic fluid W in the rotor blade 4a. The rotating machine 1 is, for example, a steam turbine that uses steam as the hydraulic fluid W.

The rotating part 4 is rotatably supported by the pair of bearings 6a and 6b (radial bearings). The bearing 6a is provided on one end side of the rotating part 4, and the bearing 6b is provided on the other end side of the rotating part 4. The bearings 6a and 6b are housed in bearing boxes 7a and 7b, respectively.

A rubbing position identification device 100 according to the embodiment is a device for identifying a rubbing occurrence position in a case where rubbing occurs in the rotating machine 1 having the above configuration. In the rotating machine 1, for example, a seal or the like attached to the stationary part 2 in which thermal deformation occurs may generate rubbing (scraping) on the rotating part 4. The rubbing position identification device 100 includes at least one AE sensor 10, at least one shaft vibration sensor 20, and a calculation unit 30 that performs calculation for identifying a rubbing position based on at least one AE sensor 10 and at least one shaft vibration sensor 20.

The AE sensor 10 is a sensor for detecting the AE signal of the rotating machine 1. An AE wave generated at a location where rubbing occurs propagates, as an elastic wave, through the stationary part 2 and the rotating part 4, and is detected as the AE signal by each AE sensor 10 installed in the rotating machine 1. The AE wave generally has a frequency in a sound wave region of several tens of kHz to several MHz, and is detected as the AE signal by the AE sensor 10. In the present embodiment, the single AE sensor 10 is provided in the bearing 6a (bearing box 7a), and thus, the AE wave from a rubbing occurrence location can be detected.

Although FIG. 1 illustrates a case where the single AE sensor 10 is provided in the bearing 6a (bearing box 7a), the single AE sensor 10 may be provided in the bearing 6b (bearing box 7b).

The shaft vibration sensor 20 is a sensor for detecting a shaft vibration signal of the rotating machine 1. The shaft vibration sensor 20 is configured such that a detecting unit is disposed to face the rotating part 4, which is a detection target of shaft vibration, and can detect the shaft vibration based on a distance between the detecting unit and the rotating part 4. In the present embodiment, the single shaft vibration sensor 20 is provided in the bearing 6a (bearing box 7a), and thus, shaft vibration from the rubbing occurrence location can be detected.

Although FIG. 1 illustrates a case where the single shaft vibration sensor 20 is provided in the bearing 6a (bearing box 7a), the single shaft vibration sensor 20 may be provided in the bearing 6b (bearing box 7b).

In the example of FIG. 1, although the AE sensor 10 and the shaft vibration sensor 20 are installed at positions different from each other in an axial direction in the common bearing 6a (bearing box 7a), the AE sensor 10 and the shaft vibration sensor 20 may be installed in different bearings (for example, one is installed in the bearing 6a (bearing box 7a) and the other is installed in the bearing 6b (bearing box 7b), respectively), or may be installed at the same positions as each other in the axial direction.

The calculation unit 30 is configured to perform calculation for identifying the rubbing position based on detection results of the AE sensor 10 and the shaft vibration sensor 20, and includes, for example, a central processing unit (CPU), a random-access memory (RAM), a read-only memory (ROM), and a computer-readable storage medium or the like. Then, a series of processing for realizing various functions is stored in a storage medium or the like in the form of a program, as an example, and the CPU reads out this program to a RAM or the like, and executes processing for information processing and calculation, whereby various functions are realized. As the program, a form installed in advance in a ROM or other storage medium, a form of being provided in a state where it is stored in a computer-readable storage medium, a form of being delivered via wired or wireless communication means, or the like may be applied. The computer-readable storage medium is a magnetic disk, a magneto-optical disk, a CD-ROM, a DVD-ROM, a semiconductor memory, or the like.

The calculation unit 30 includes a rubbing determination unit 32 for determining whether or not rubbing has occurred, and a rubbing position identification unit 34 for identifying a rubbing occurrence position in a case where it is determined that rubbing has occurred. It is assumed that a method for determining whether or not rubbing has occurred in the rubbing determination unit 32 follows a known example, and details will be omitted. However, early rubbing determination can be performed by performing determination based on the AE signal detected by the AE sensor 10.

Figure 2:
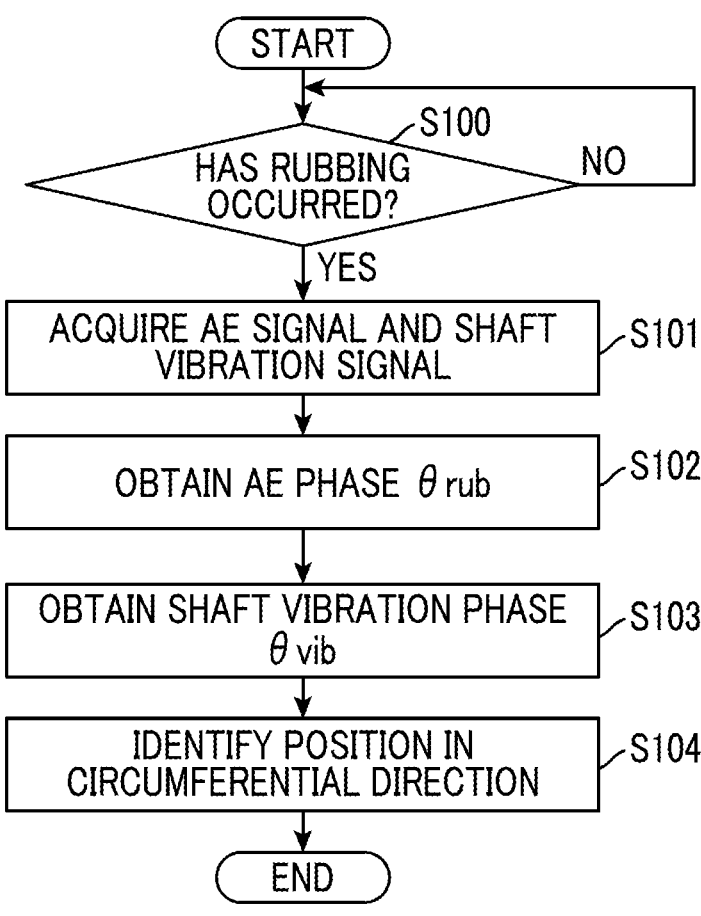
FIG. 2 is a flowchart illustrating a rubbing position identification method according to the embodiment.

Next, a rubbing position identification method performed by the rubbing position identification device 100 having the above configuration will be described. FIG. 2 is a flowchart illustrating a rubbing position identification method according to the embodiment.

First, the rubbing determination unit 32 determines whether or not rubbing has occurred (step S100). The rubbing determination in step S100 is performed, for example, based on the AE signal detected by the AE sensor 10. In a case where the rubbing determination unit 32 determines that rubbing has occurred (step S100: YES), the rubbing position identification unit 34 acquires the AE signal detected by the AE sensor 10 and the shaft vibration signal detected by the shaft vibration sensor 20 (step S101).

Figure 3A:
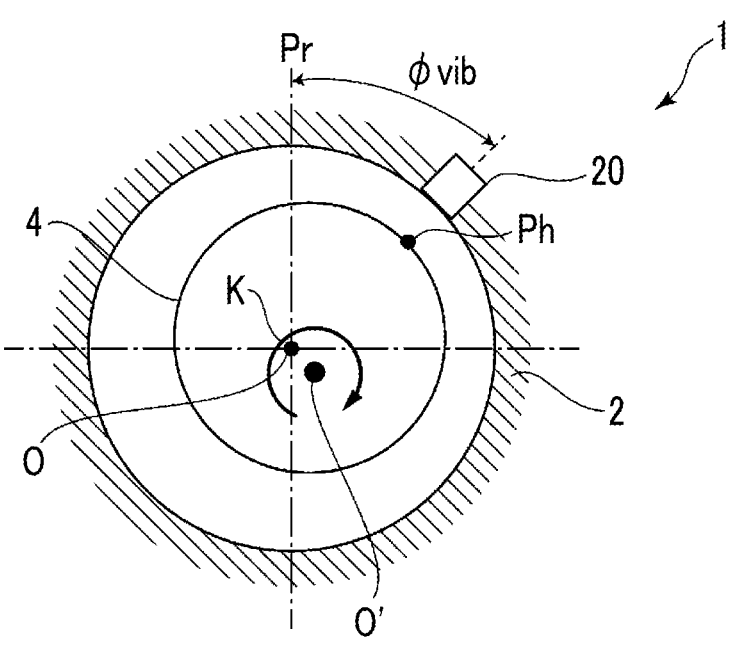
FIG. 3A is a schematic view illustrating a scene of an inside of the rotating machine.
Figure 3B:
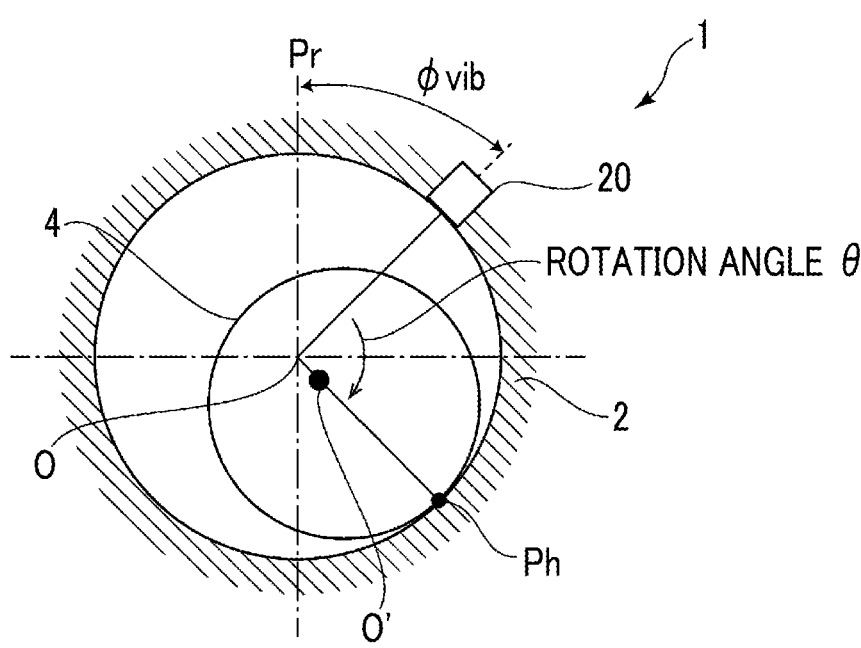
FIG. 3B is a schematic view illustrating the scene of the inside of the rotating machine.
Figures 4, 5:
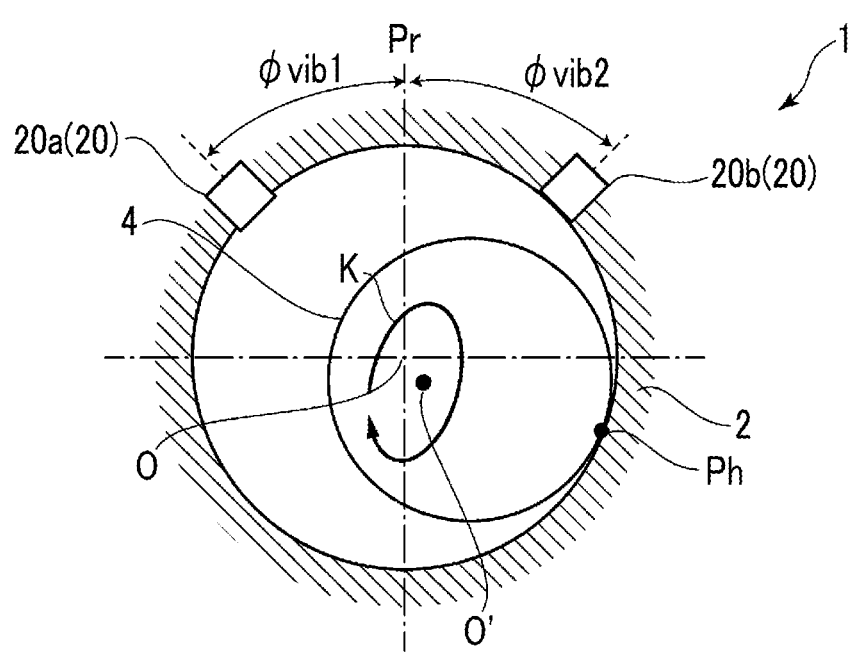
FIG. 4 is an example of an AE signal and a shaft vibration signal acquired in step S101 of FIG. 2.
FIG. 5 is a schematic view illustrating an attachment position of a shaft vibration sensor in a rubbing position identification device according to another embodiment from an axial direction.

Here, FIGS. 3A and 3B are schematic views illustrating a scene of an inside of the rotating machine 1, and FIG. 4 is an example of the AE signal and the shaft vibration signal acquired in step S101 of FIG. 2. As illustrated in FIGS. 3A and 3B, the rotating part 4 is rotationally driven inside the stationary part 2. At this time, a high spot position Ph positioned at an outermost side of the rotating part 4 in a radial direction moves on an orbit K eccentric with respect to a center O of the stationary part 2 (for example, a substantially circular orbit having a swing center O'). FIG. 3A illustrates a scene in which the high spot position Ph is closest to the shaft vibration sensor 20 attached at a position of the stationary part 2 at an attachment angle φvib from a predetermined reference position Pr, and FIG. 3B illustrates a scene in which rubbing occurs by bringing the high spot position Ph into contact with the stationary part 2.

FIG. 4 illustrates temporal changes in the AE signal and the shaft vibration signal simultaneously detected by the AE sensor 10 and the shaft vibration sensor 20. Such detection of the AE signal by the AE sensor 10 and detection of the shaft vibration signal by the shaft vibration sensor 20 are continuously performed, and in step S101, the detection of the AE signal and the shaft vibration signal are performed over a predetermined time by the determination that rubbing has occurred as a trigger. The predetermined time is appropriately set such that the AE signal and the shaft vibration signal sufficient to specify an AE phase θrub and a shaft vibration phase θvib to be described later are acquired.

The AE signal generally has a waveform of which an amplitude fluctuates at a predetermined frequency, and in a case where rubbing has occurred in the rotating machine 1, a component synchronized with a rotation speed of the rotating machine 1 (rotation speed synchronization component) appears on an envelope Lh specified based on a peak of the waveform included in the AE signal, as illustrated in FIG. 4. Such a rotation speed synchronization component has a behavior that varies to periodically show a maximum peak.

In addition, the shaft vibration signal has a waveform of which an amplitude changes periodically as illustrated in FIG. 4 to correspond to a distance between the shaft vibration sensor 20 attached to the stationary part 2 and the rotating part 4. Such a shaft vibration signal is obtained as a sinusoidal wave having a maximum peak at a timing at which the high spot position Ph passes in the vicinity of the shaft vibration sensor 20.

Subsequently, the rubbing position identification unit 34 obtains the AE phase θrub based on the AE signal acquired in step S101 (step S102). As illustrated in FIG. 4, the AE phase θrub is specified as a phase corresponding to a peak of the envelope Lh specified based on the temporal change of the AE signal (a rotation angle θ at which the rotation speed synchronization component of the envelope Lh of the AE signal is maximum).

In addition, the rubbing position identification unit 34 obtains the shaft vibration phase θvib based on the shaft vibration signal acquired in step S101 (step S103). As illustrated in FIG. 4, the shaft vibration phase θvib is specified as a phase corresponding to the high spot position Ph of the rotating part 4 specified based on the temporal change of the shaft vibration signal (a rotation angle at which an amplitude of the shaft vibration signal is maximum).

Subsequently, the rubbing position identification unit 34 identifies a position of the rubbing occurrence location of the rotating machine 1 in a circumferential direction based on a difference Δθ between the AE phase θrub obtained in step S102 and the shaft vibration phase θvib obtained in step S103 (step S104). Specifically, a position φrub in the circumferential direction where rubbing occurs is identified by the following expression by using the attachment angle φvib of the shaft vibration sensor 20 in the stationary part 2.

$$\varphi rub = \varphi vib + \Delta\theta = \varphi vib + (\theta rub - \theta vib) \qquad (1)$$

In addition, φvib and φrub are angles with respect to the reference position Pr defined in the stationary part 2. For example, a position where a one-pulse meter (not illustrated) for measuring the rotation speed of the rotating part 4 is installed can be used as the reference position Pr. In addition, θvib and θrub are rotation angles θ with respect to a reference angle of the rotating part 4, and, for example, an angle at which a one-pulse marker provided in the rotating part 4 passes through a position of the one-pulse meter provided in the stationary part 2 can be used as the reference angle.

In the rotating machine 1 that does not include the one-pulse meter, for example, the position of the rubbing occurrence location in the circumferential direction can be similarly identified by using the rotation angle θ when a shaft vibration displacement is maximized as the reference angle. In this case, θvib=0, and θrub is a relative rotation angle from the rotation angle at which the shaft vibration displacement is maximized.

As described above, according to the present embodiment, the position of the rubbing occurrence location in the circumferential direction can be suitably identified based on the AE signal detected by the single AE sensor 10 and the shaft vibration signal detected by the shaft vibration sensor 20. Since such identification of the position in the circumferential direction does not require complicated configuration or calculation and is not easily influenced by noise, it is possible to identify a rubbing g position with high reliability even under various conditions.

Then, the position of the rubbing occurrence location in the circumferential direction is identified in this manner, and thus, it is possible to determine an effective countermeasure for the rotating machine 1 based on the identification result. For example, in a case where the stationary part 2 includes two casings that are vertically divided, and in a case where the position of the rubbing occurrence location in the circumferential direction is on an upper side, only a casing on the upper side is opened to take countermeasures. Accordingly, the scope of countermeasures can be effectively narrowed down. In addition, in a case where the position of the rubbing occurrence location in the circumferential direction is on a lower side, it is possible to ascertain in advance whether or not the rotating part 4 needs to be lifted in order to rework the casing on the lower side, and it is possible to efficiently make a work plan. In addition, in a case where a mechanism capable of adjusting the clearance D by heating or cooling the stationary part 2 is provided, it is determined in which direction the clearance D is to be adjusted, based on the position of the rubbing occurrence location in the circumferential direction, and the mechanism can be operated or controlled based on the determination result.

In the above-described embodiment, the position in the circumferential direction can be suitably identified under a condition in which i) the orbit K at the high spot position Ph on a cross section perpendicular to the axial direction has a substantially circular shape, ii) the position of the rubbing occurrence location in the axial direction is in the vicinity of the shaft vibration sensor 20, iii) the shaft vibration phase $\theta$vib is uniform in the axial direction, or the like is satisfied. However, in a case where any of these conditions is not satisfied, there is a concern that identification accuracy degrades. Such a problem can be suitably solved by the following embodiments.

FIG. 5 is a schematic view illustrating an attachment position of a shaft vibration sensor 20 in a rubbing position identification device 100 according to another embodiment from an axial direction. In the present embodiment, the orbit K has a substantially elliptical shape with respect to the swing center O', and a first shaft vibration sensor 20a and a second shaft vibration sensor 20b having attachment angles different from each other are provided as the shaft vibration sensor 20 on an identical cross section perpendicular to the axial direction. That is, an attachment angle φvib1 of the first shaft vibration sensor 20a and an attachment angle φvib2 of the second shaft vibration sensor 20b are different. In the present embodiment, in particular, a case where the attachment angle φvib1 of the first shaft vibration sensor 20a and the attachment angle φvib2 of the second shaft vibration sensor 20b are 90 degrees different from each other is illustrated.

Figure 6:
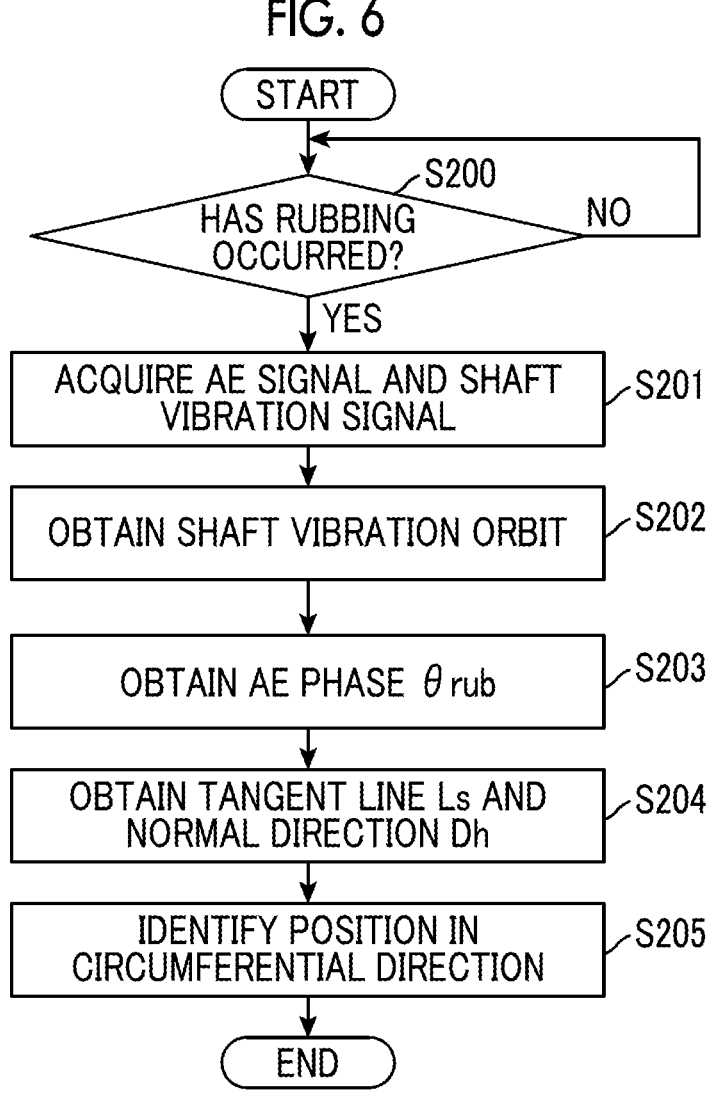
FIG. 6 is a flowchart illustrating a rubbing position identification method according to another embodiment.

Next, a rubbing position identification method that can be performed by the rubbing position identification device 100 having the above configuration will be described. FIG. 6 is a flowchart illustrating a rubbing position identification method according to another embodiment.

First, a rubbing determination unit 32 determines whether or not rubbing has occurred (step S200) similarly to step S100 described above. In a case where the rubbing determination unit 32 determines that rubbing has occurred (step S200: YES), the rubbing position identification unit 34 acquires an AE signal detected by an AE sensor 10 and shaft vibration signals detected by the first shaft vibration sensor 20a and the second shaft vibration sensor 20b (step S201).

Figure 7:
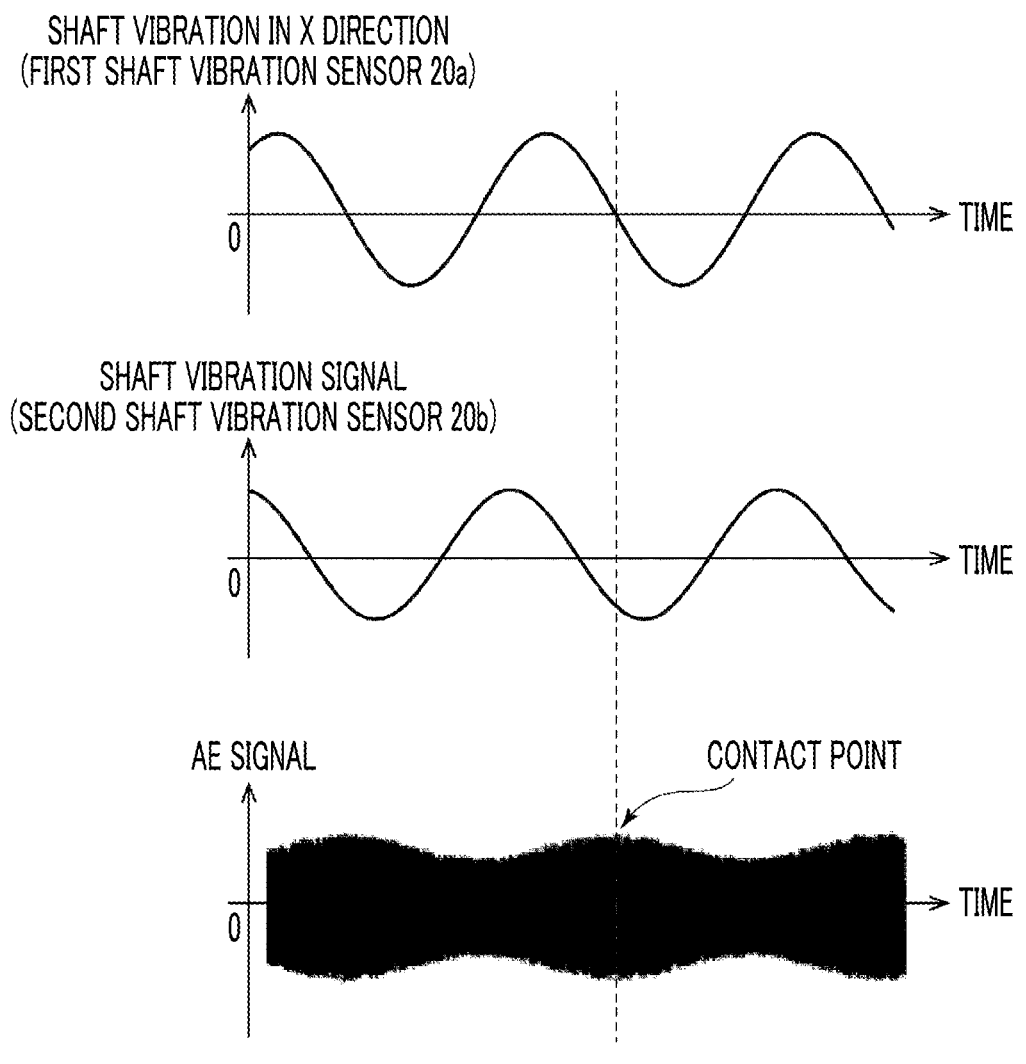
FIG. 7 is an example of an AE signal detected by an AE sensor and acquired in step S201 of FIG. 6, and shaft vibration signals detected by a first shaft vibration sensor and a second shaft vibration sensor.

Here, FIG. 7 is an example of the AE signal detected by the AE sensor 10 and acquired in step S201 of FIG. 6 and the shaft vibration signals detected by the first shaft vibration sensor 20a and the second shaft vibration sensor 20b. The shaft vibration signal detected by the first shaft vibration sensor 20a has a predetermined phase difference from the shaft vibration signal detected by the second shaft vibration sensor 20b. The phase difference corresponds to the attachment angle φvib1 of the first shaft vibration sensor 20a and to the attachment angle φvib2 of the second shaft vibration sensor 20b.

Figure 8A:
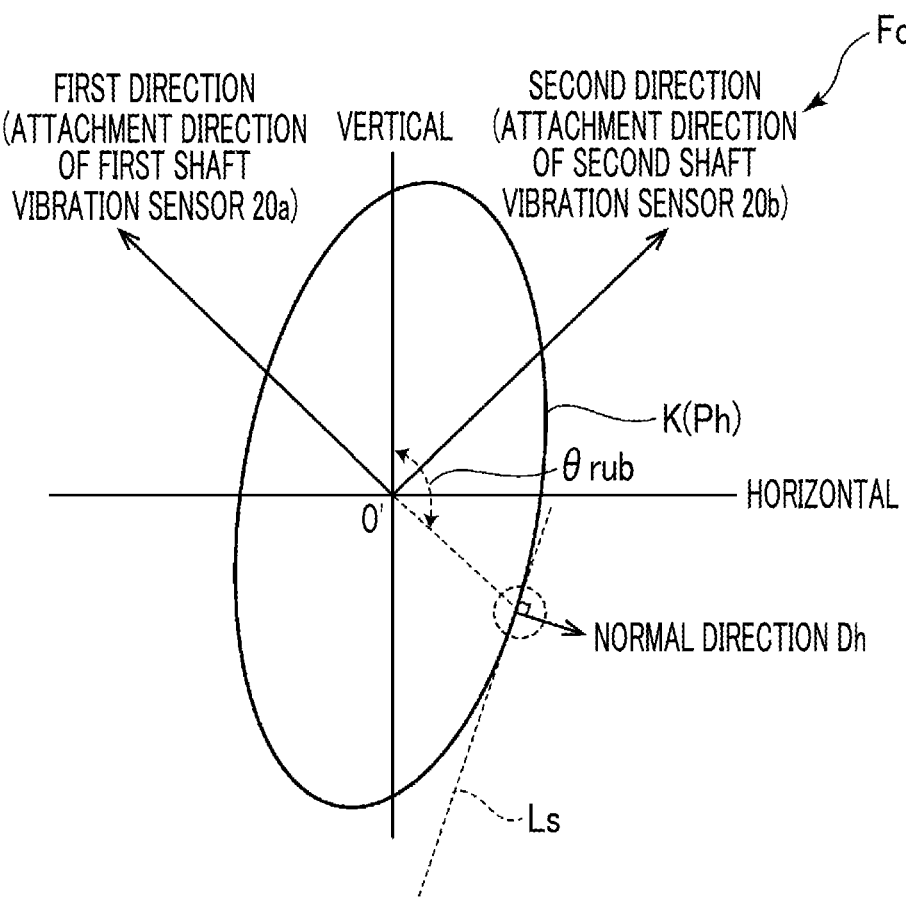
FIG. 8A is an example of an orbit chart created in step S202 of FIG. 6.
Figure 8B:
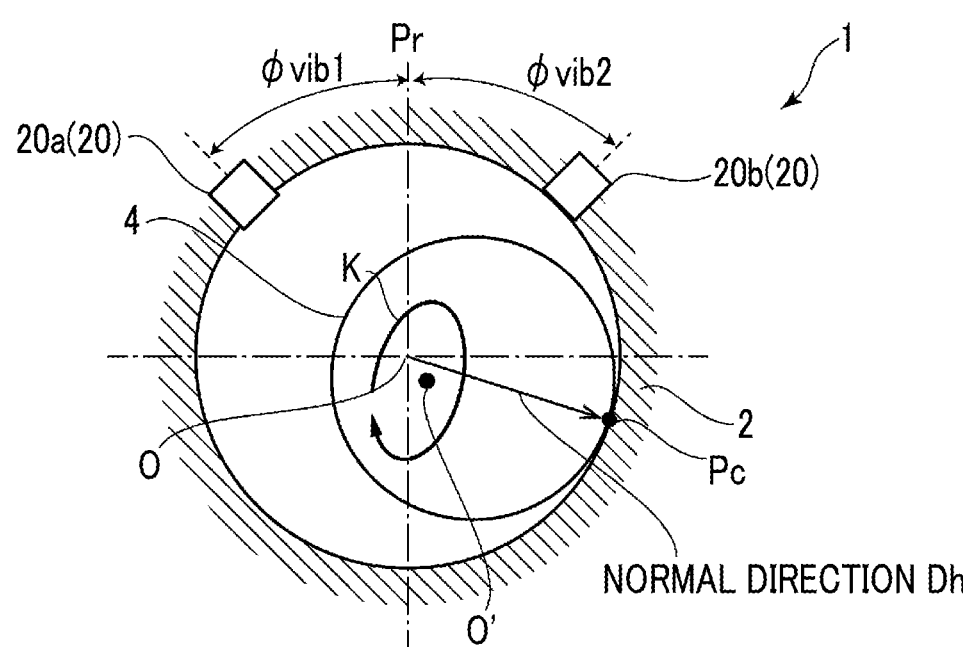
FIG. 8B is an identification example of a rubbing position in a circumferential direction based on a normal direction specified from the orbit chart of FIG. 8A.

Subsequently, the rubbing position identification unit 34 obtains a shaft vibration orbit of a rotating part 4 based on the shaft vibration signals acquired in step S201 (step S202). The shaft vibration orbit is obtained by creating an orbit chart Fo based on the shaft vibration signal detected by the first shaft vibration sensor 20a and the shaft vibration signal detected by the second shaft vibration sensor 20b. Here, FIG. 8A is an example of the orbit chart Fo created in step S202 of FIG. 6, and FIG. 8B is an identification example of a rubbing position in a circumferential direction based on a normal direction Dh specified from the orbit chart Fo of FIG. 8A. The orbit chart Fo of FIG. 8A illustrates that an orbit K at a high spot position Ph with respect to the swing center O' has a substantially elliptical shape on a plane defined by a first direction corresponding to an attachment direction of the first shaft vibration sensor 20a and a second direction corresponding to an attachment direction of the second shaft vibration sensor 20b.

Subsequently, the rubbing position identification unit 34 obtains an AE phase $\theta$rub based on the AE signal acquired in step S201 (step S203). Similarly to step S102 described above, as illustrated in FIG. 7, in step S203, the AE phase $\theta$rub is specified as a phase corresponding to a peak of an envelope specified based on a temporal change of the AE signal (a rotation angle $\theta$ when a rotation speed synchronization component of an envelope Lh of the AE signal is maximized).

Subsequently, as illustrated in FIG. 8A, the rubbing position identification unit 34 specifies a tangent line Ls passing through a position corresponding to the AE phase $\theta$rub obtained in step S203 in the orbit K obtained in step S202, and further obtains a normal direction Dh of the tangent line Ls (step S204). Then, as illustrated in FIG. 8B, the rubbing position identification unit 34 identifies the rubbing position in the circumferential direction as an intersection point Pc between the stationary part 2 and a straight line passing through a center of the stationary part 2 and parallel to the normal direction Dh (step S205).

As described above, in the present embodiment, the position of the rubbing occurrence location in the circumferential direction can be identified based on the orbit K (orbit chart Fo) created from the shaft vibration signals detected by the first shaft vibration sensor 20a and the second shaft vibration sensor 20b attached at different positions from each other. In such an identification method, for example, even in a case where the orbit K at the high spot position Ph on a cross section perpendicular to the axial direction does not have a substantially circular shape such as an elliptical shape, the position in the circumferential direction can be suitably identified.

Figure 9:
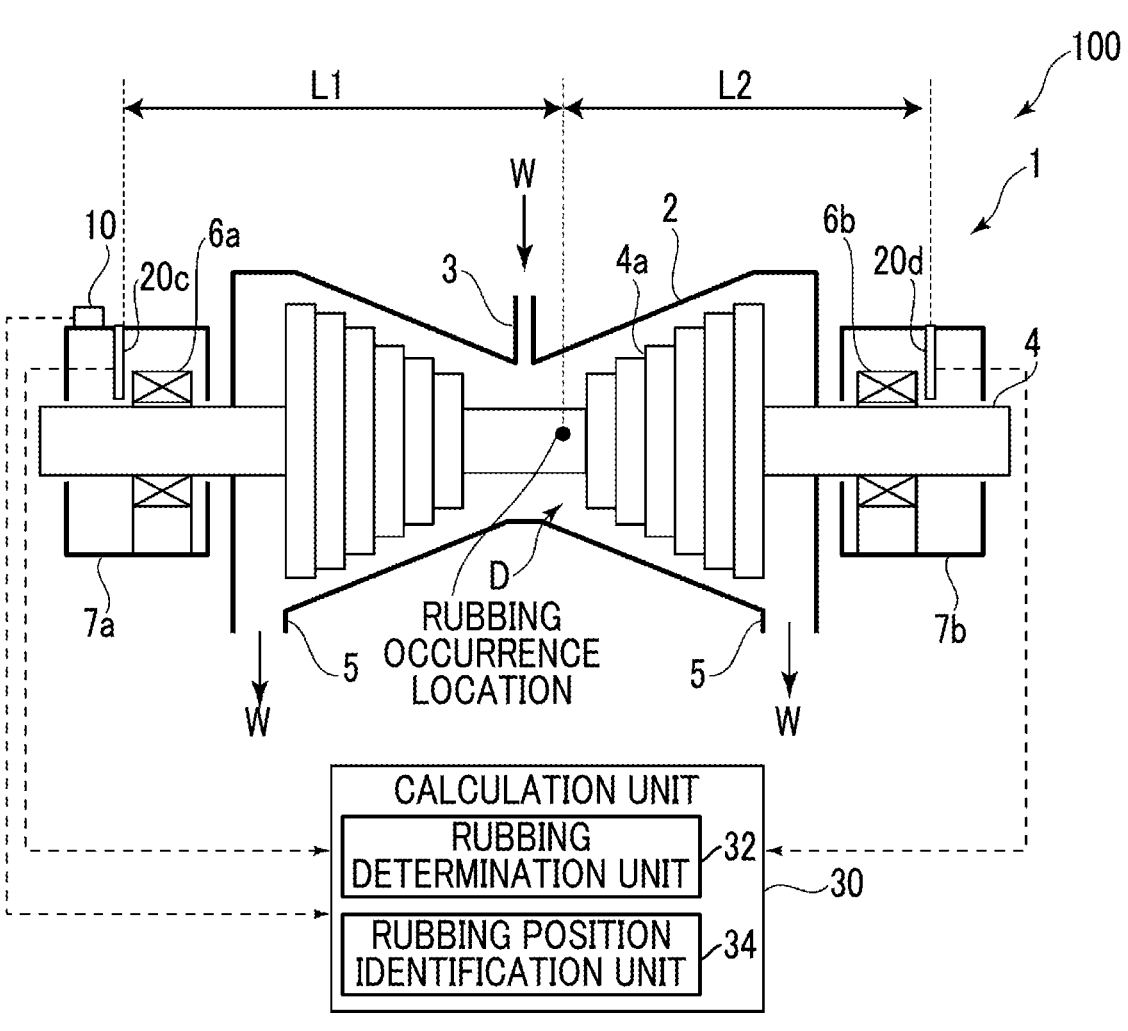
FIG. 9 is a diagram illustrating a configuration of a rubbing position identification device according to another embodiment.

Next, FIG. 9 is a diagram illustrating a configuration of a rubbing position identification device 100 according to another embodiment. In the present embodiment, the rubbing position identification device 100 includes, as a shaft vibration sensor 20, a third shaft vibration sensor 20c and a fourth shaft vibration sensor 20d, which are respectively installed at positions different from each other in an axial direction. The third shaft vibration sensor 20c and the fourth shaft vibration sensor 20d are provided in bearing boxes 7b and 7b of bearings 6a and 6b, respectively.

Similarly to FIG. 1, in the example of FIG. 9, the AE sensor 10 and the third shaft vibration sensor 20c are installed at positions of the common bearing 6a (bearing box 7a) different from each other in the axial direction, but may be installed in the different bearings (for example, one is installed in the bearing 6a (bearing box 7a) and the other is installed in the bearing 6b (bearing box 7b), respectively), or may be installed at the same positions as each other in the axial direction.

Figure 10:
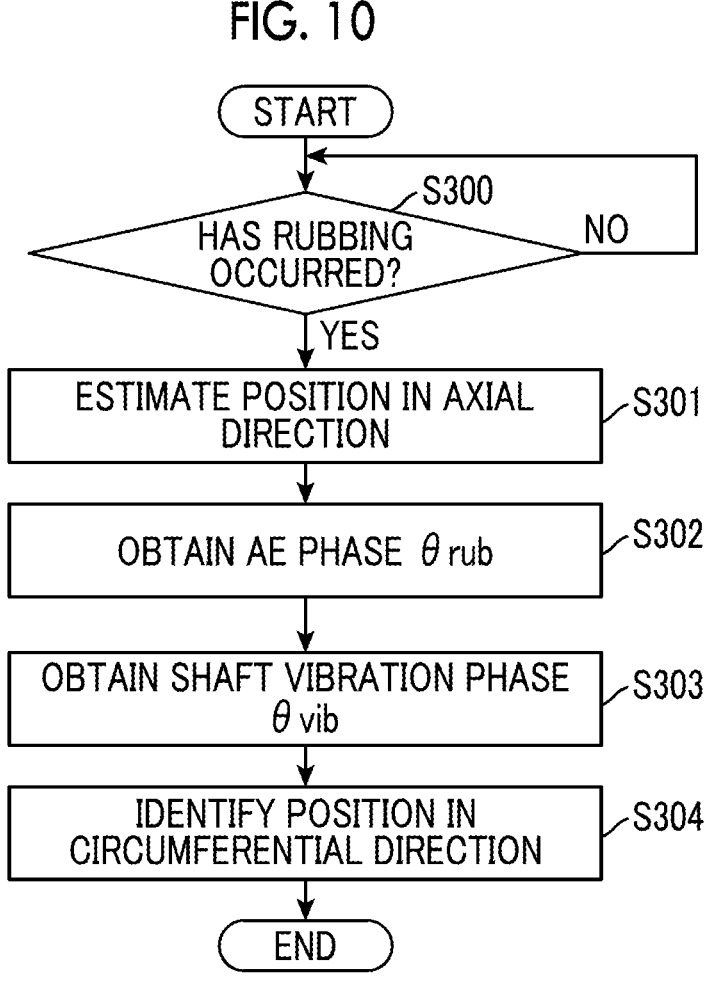
FIG. 10 is a flowchart illustrating a rubbing position identification method that can be performed by the rubbing position identification device of FIG. 9.

FIG. 10 is a flowchart illustrating a rubbing position identification method that can be performed by the rubbing position identification device 100 of FIG. 9. In the present embodiment, it is assumed that deformation that occurs in a rotating part 4 during an operation of a rotating machine 1 is sufficiently small and the rotating part 4 can be regarded as a rigid body.

First, a rubbing determination unit 32 determines whether or not rubbing has occurred (step S300) similarly to steps S100 and S200 described above. In a case where the rubbing determination unit 32 determines that rubbing occurred (step S300: YES), the rubbing position identification unit 34 estimates a position of the rubbing in the axial direction in the rotating part 4 (step S301). The estimation of the position in the axial direction may be performed, for example, based on design specifications of a stationary part 2 and the rotating part 4 of the rotating machine 1 (for example, a position where rubbing is likely to occur based on a distribution of a clearance D along the axial direction is estimated), or may be performed by numerical analysis, or the clearance D may be estimated based on a measurement result of a sensor (not illustrated) that can measure the clearance D.

Subsequently, the rubbing position identification unit 34 obtains an AE phase θrub based on the AE signal acquired in step S301 similarly to step S102 described above (step S302). The AE phase θrub is specified as a phase corresponding to a peak of an envelope Lh specified based on a temporal change of the AE signal (a rotation angle θ when a rotation speed synchronization component of an envelope Lh of the AE signal is maximized).

Figure 11:
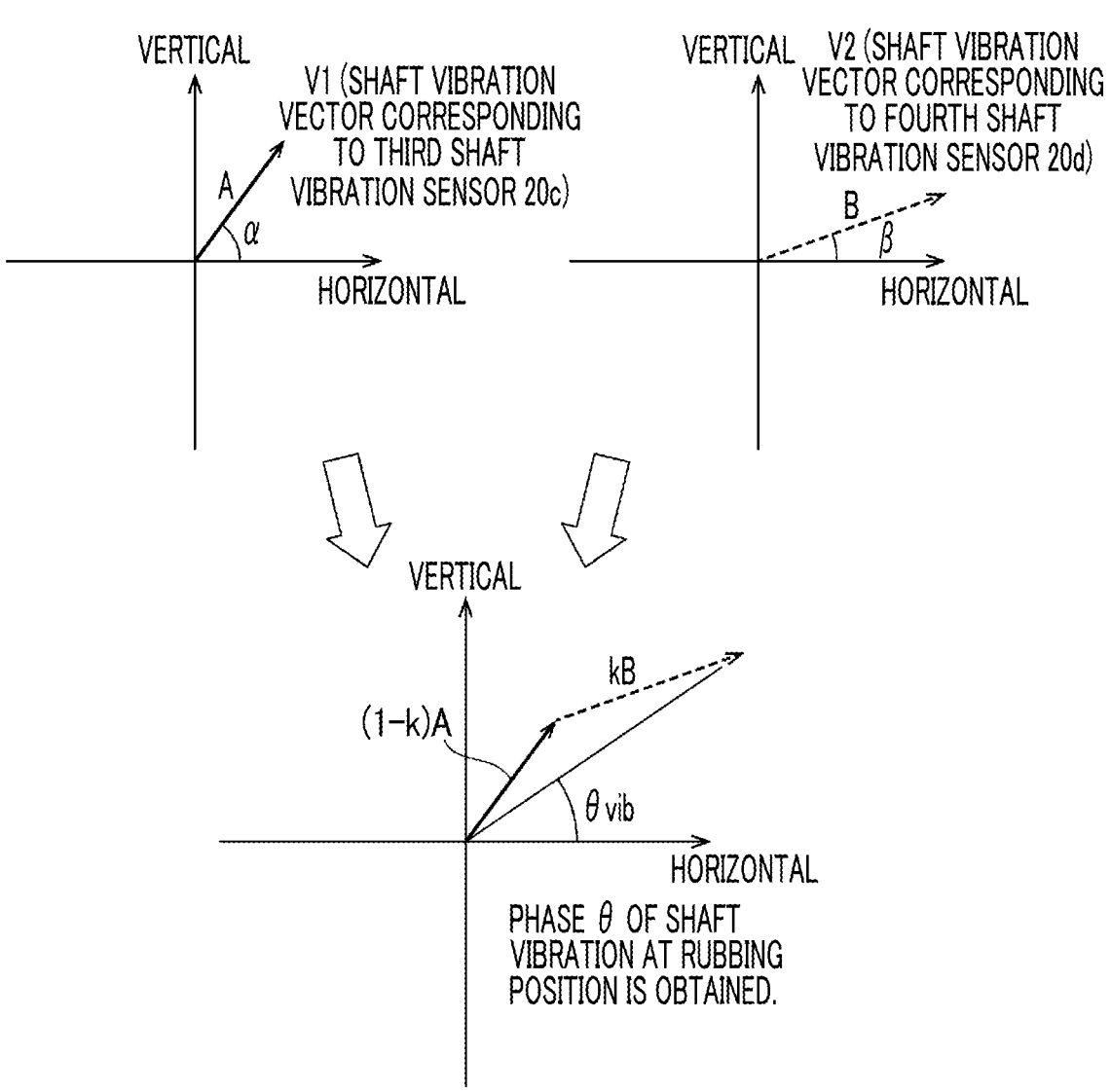
FIG. 11 is an explanatory diagram of linear interpolation of a shaft vibration vector corresponding to a shaft vibration signal detected by a third shaft vibration sensor and a shaft vibration vector corresponding to a shaft vibration signal detected by a fourth shaft vibration sensor.

Subsequently, as illustrated in FIG. 11, the rubbing position identification unit 34 obtains a shaft vibration phase θvib at the position in the axial direction by linearly interpolating a shaft vibration vector V1 (amplitude A, phase α) corresponding to the shaft vibration signal detected by the third shaft vibration sensor 20c and a shaft vibration vector V2 (amplitude B, phase β) corresponding to the shaft vibration signal detected by the fourth shaft vibration sensor 20d (step S303). Specifically, as illustrated in FIG. 9, in a case where it is assumed that a distance in the axial direction from the third shaft vibration sensor 20c to the rubbing occurrence position is L1 and a distance in the axial direction from the fourth shaft vibration sensor 20d to the rubbing occurrence position is L2, the shaft vibration phase θvib at the rubbing occurrence position is obtained by the following expression.

$$\theta vib = \tan^{-1}\left(\frac{(1-k)\cdot A\cdot \sin\cdot\ \alpha + k\cdot B\cdot \sin\ \beta}{(1-k)\cdot A\cdot \cos\cdot\ \alpha + k\cdot B\cdot \cos\ \beta}\right) \quad (2)$$

Here, α is a phase delay of shaft vibration at a position of the third shaft vibration sensor 20c, β is a phase delay of shaft vibration at a position of the fourth shaft vibration sensor 20d, and k=L1/(L1+L2).

Subsequently, the rubbing position identification unit 34 identifies the position of the rubbing occurrence location in the circumferential direction similarly to step S104 based on a difference between the AE phase θrub obtained in step S302 and the shaft vibration phase θvib obtained in step S303 (step S304).

According to the present embodiment, even in a case where the position in the axial direction where rubbing occurs is away from the shaft vibration sensor 20, the rubbing position in the circumferential direction can be suitably identified in any position in the axial direction via linear interpolation of the shaft vibration vectors based on the shaft vibration signals detected by the third shaft vibration sensor 20c and the fourth shaft vibration sensor 20d provided at different positions along the axial direction.

FIG. 12 is a flowchart illustrating another rubbing position identification method that can be performed by the rubbing position identification device 100 of FIG. 9. The present embodiment can be applied to a case where the deformation of the rotating part 4 cannot be ignored and cannot be approximated as a rigid body mode.

First, the rubbing determination unit 32 determines whether or not rubbing has occurred (step S400) similarly to steps S100, S200, and S300 described above. In a case where the rubbing determination unit 32 determines that rubbing has occurred (step S400: YES), the rubbing position identification unit 34 specifies a vibration mode that can be excited at a rotation speed when rubbing occurs (step S401). For example, before the present method is performed, a mode analysis is performed in advance to acquire a relationship between a rotation speed of the rotating part 4 and a type of vibration mode excited at each rotation speed, and in step S401, it is specified which vibration mode can be excited by applying the rotation speed at the time of rubbing to the relationship.

Subsequently, the rubbing position identification unit 34 determines whether or not the number of vibration modes specified in step S401 is equal to or less than the number of shaft vibration sensors 20 disposed at positions different from each other in the axial direction (step S402). In the present embodiment, a case where the condition of step S402 is satisfied (a case where the number of vibration modes and the number of shaft vibration sensors 20 are equal) by specifying the two vibration modes in step S401 will be described.

In a case where the number of vibration modes is less than the number of shaft vibration sensors 20 disposed at positions different from each other in the axial direction (step S402: NO), the following identification method is not established, and the processing is ended.

In a case where the number of vibration modes is equal to or less than the number of shaft vibration sensors 20 disposed at positions different from each other in the axial direction (step S402: YES), the rubbing position identification unit 34 calculates an amplitude ratio between the position of the shaft vibration sensor 20 in the axial direction and the position of the rubbing occurrence location in the axial direction via mode analysis for each vibration mode specified in step S401 (step S403). Here, as a specific example of step S403, a case where a ratio of a vibration amplitude in the third shaft vibration sensor 20c, a vibration amplitude in the fourth shaft vibration sensor 20d, and a vibration amplitude at the rubbing occurrence location is calculated as $1:\beta 1:\gamma 1$ in a first vibration mode and a ratio of the vibration amplitude in the third shaft vibration sensor 20c, the vibration amplitude in the fourth shaft vibration sensor 20d, and the vibration amplitude at the rubbing occurrence location is calculated as $1:\beta 2:\gamma 2$ in a second vibration mode will be described.

Subsequently, the rubbing position identification unit 34 defines, as vectors obtained by plotting the amplitudes and the phase delays of the shaft vibration signals in a polar coordinate system, the shaft vibration vectors corresponding to the shaft vibration signals detected by the third shaft vibration sensor 20c and the fourth shaft vibration sensor 20d (step S404). Here, a shaft vibration vector $\vec{A}$ corresponding to the third shaft vibration sensor 20c and a shaft vibration vector $\vec{B}$ corresponding to the fourth shaft vibration sensor 20d are expressed by the following expressions by using exciting force coefficients k1 and k2.

$$\vec{A}=k_1\vec{A_1}+k_2\vec{A_2} \tag{3}$$

$$\vec{B}=k_1\beta_1\vec{A_1}+k_2\beta_2\vec{A_2} \tag{4}$$

Then, the rubbing position identification unit 34 obtains the exciting force coefficients k1 and k2 by simultaneously solving Expressions (3) and (4) (step S405), and calculates a shaft vibration vector $\vec{C}$ at the position of the rubbing occurrence location in the axial direction by using the exciting force coefficients k1 and k2 (step S406).

$$\vec{C}=k_1\gamma_1\vec{A_1}+k_2\gamma_2\vec{A_2} \tag{5}$$

Subsequently, the rubbing position identification unit 34 specifies the shaft vibration phase θvib based on the shaft vibration vector $\vec{C}$ calculated in step S406 (step S407). In addition, the rubbing position identification unit 34 obtains the AE phase θrub based on the AE signal detected by the AE sensor 10 similarly to step S102 described above (step S408). Then, the rubbing position identification unit 34 identifies the position of the rubbing occurrence location in the circumferential direction based on the difference between the shaft vibration phase θvib obtained in step S407 and the AE phase θrub obtained in step S408 similarly to step S104 described above (step S409).

As described above, according to the present embodiment, even in a case where the deformation of the rotating part 4 cannot be ignored and cannot be approximated as the rigid body mode, a contact position in the circumferential direction can be identified at any position in the axial direction by using the mode analysis.

In addition, it is possible to appropriately replace the components in the embodiment described above with well-known components within the scope which does not depart from the gist of the present disclosure, and the embodiments described above may be combined appropriately.

For example, the contents described in each embodiment are understood as follows.

(1) A rubbing position identification device for a rotating machine according to one aspect is a rubbing position identification device (for example, a rubbing position identification device 30 of the above embodiment) of a rotating machine (for example, a rotating machine 1 of the above embodiment) that includes a fixed part (for example, a fixed part 2 of the above embodiment) and a rotating part (for example, a rotating part 4 of the above embodiment). The device includes at least one AE sensor (for example, an AE sensor 10 of the above embodiment) for detecting an AE signal of the rotating machine, at least one shaft vibration sensor (for example, a shaft vibration sensor 20 of the above embodiment) for detecting a shaft vibration signal of the rotating part, and a rubbing position identification unit (for example, a rubbing position identification unit 34 of the above embodiment) for identifying a position of a rubbing occurrence location of the rotating machine in a circumferential direction based on a difference between an AE phase (for example, the AE phase θrub of the above embodiment) corresponding to a peak of an envelope specified based on a temporal change of the AE signal and a shaft vibration phase (for example, a shaft vibration phase θvib of the above embodiment) corresponding to a high spot position (for example, a high spot position Ph of the above embodiment) of the rotating part specified based on a temporal change of the shaft vibration signal in a case where rubbing occurs in the rotating machine.

According to the aspect of the above (1), the position in the circumferential direction where rubbing has occurred can be suitably identified based on the AE signals detected by a small number of AE sensors and the shaft vibration signal detected by the shaft vibration sensor. Since such identification of the position in the circumferential direction does not require complicated configuration or calculation and is not easily influenced by noise, it is possible to identify a rubbing position with high reliability even under various conditions.

(2) In another aspect, in the aspect of the above (1), when the position in the circumferential direction is φrub, an attachment position of the shaft vibration sensor with respect to a reference position is φvib, the AE phase is θrub, and the shaft vibration phase is θvib, the position in the circumferential direction φrub is expressed by the following expression:

$$\varphi rub=\varphi vib+(\theta rub-\theta vib).$$

According to the aspect of the above (2), the position of the rubbing occurrence location in the circumferential direction can be suitably identified based on the difference between the AE phase and the shaft vibration phase.

(3) In another aspect, in the aspect of the above (1) or (2), the at least one shaft vibration sensor is configured to detect the shaft vibration signal having an amplitude corresponding to a size of a clearance (for example, a clearance D of the above embodiment) present between the shaft vibration sensor and the rotating part installed at the fixed part, and the rubbing position identification unit specifies the high spot position based on a maximum peak included in a temporal change of the amplitude.

According to the aspect of the above (3), the high spot position necessary for obtaining the shaft vibration phase can be suitably specified based on the temporal change of the amplitude of the shaft vibration signal detected by the shaft vibration sensor.

(4) In another aspect, in the aspect of the above (1), the at least one shaft vibration sensor includes a first shaft vibration sensor (for example, a first shaft vibration sensor 20a of the above embodiment) and a second shaft vibration sensor (for example, a second shaft vibration sensor 20b of the above embodiment) having attachment angles different from each other, and the rubbing position identification unit obtains an orbit of the high spot position based on the shaft vibration signals detected by the first shaft vibration sensor and the second shaft vibration sensor, and identifies the position in the circumferential direction based on the orbit and the AE phase.

According to the aspect of the above (4), the position of the rubbing occurrence location in the circumferential direction can be suitably identified based on the orbit of the high spot position obtained based on the shaft vibration signals detected by the plurality of shaft vibration sensors and the AE phase based on the AE signal detected by the AE sensor even in a case where the orbit at the high spot position has a non-circular shape, for example, such as an ellipse.

(5) In another aspect, in the aspect of the above (4), the rubbing position identification unit identifies the position in the circumferential direction via a normal direction of a tangent line passing through a point corresponding to the AE phase and plotted on the orbit.

According to the aspect of the above (5), the position in the circumferential direction can be identified by plotting a point corresponding to the AE phase on the orbit and obtaining the normal direction of the tangent line passing through the point.

(6) In another aspect, in any one aspect of the above (1) to (5), the at least one shaft vibration sensor includes a third shaft vibration sensor (for example, a third shaft vibration sensor 20c of the above embodiment) and a fourth shaft vibration sensor (for example, a fourth shaft vibration sensor 20d of the above embodiment) installed at positions different from each other in an axial direction, and the rubbing position identification unit calculates the position in the axial direction via linear interpolation of shaft vibration vectors based on the shaft vibration signals detected by the third shaft vibration sensor and the fourth shaft vibration sensor.

According to the aspect of the above (6), the position in the circumferential direction can be appropriately identified even in a case where there is the rubbing occurrence location at positions in the axial direction present between two shaft vibration sensors by linearly interpolating the shaft vibration vectors based on the shaft vibration signals detected by two shaft vibration sensors present at positions different from each other in the axial direction.

(7) In another aspect, in any one aspect of the above (1) to (6), the at least one shaft vibration sensor includes a fifth shaft vibration sensor (for example, a fifth shaft vibration sensor 20e) and a sixth shaft vibration sensor (for example, a sixth shaft vibration sensor 20f) installed at positions different from each other in an axial direction, and the rubbing position identification unit identifies the position in the circumferential direction by obtaining a shaft vibration vector corresponding to the rubbing occurrence location as a linear sum of shaft vibration vectors corresponding to the fifth shaft vibration sensor and the sixth shaft vibration sensor, by using a coefficient that defines a vibration amplitude ratio between the fifth shaft vibration sensor, the sixth shaft vibration sensor, and the rubbing occurrence location for each vibration mode obtained in a mode analysis.

According to the aspect of the above (7), the rubbing position in the circumferential direction can be identified by obtaining the shaft vibration vector at the rubbing occurrence location as the linear sum of the shaft vibration vectors corresponding to the shaft vibration sensors by using the coefficient corresponding to the vibration amplitude ratio between the shaft vibration sensors and the rubbing occurrence location for each vibration mode. Such identification of the position in the circumferential direction can be suitably performed even in a case where the rotating part cannot be regarded as the rigid body due to deformation such as twisting during the operation of the rotating machine.

(8) In another aspect, in any one aspect of the above (1) to (7), the shaft vibration sensor and the AE sensor are provided in bearing boxes (for example, bearing boxes 7 of the above embodiment) in which bearings (for example, bearings 6 of the above embodiment) that rotatably support the rotating part with respect to a stationary part are housed.

According to the aspect of the above (8), the shaft vibration sensor and the AE sensor are provided in the bearing boxes in which the bearings that rotatably support the rotary shaft are housed, and thus, the shaft vibration and the AE wave can be appropriately detected from the rubbing.

(9) In another aspect, in any one aspect of the above (1) to (8), the rotating machine is a steam turbine.

According to the aspect of the above (9), the position of the rubbing generated in the steam turbine in the circumferential direction can be suitably identified.

(10) A rubbing position identification method for a rotating machine according to one aspect is a rubbing position identification method of a rotating machine (for example, a rotating machine 1 of the above embodiment) that includes a fixed part (for example, a fixed part 2 of the above embodiment) and a rotating part (for example, a rotating part 4 of the above embodiment). The method includes a step of detecting an AE signal of the rotating machine, a step of detecting a shaft vibration signal of the rotating part, and a step of identifying a position of a rubbing occurrence location of the rotating machine in a circumferential direction based on a difference between an AE phase (for example, an AE phase θrub of the above embodiment) corresponding to a peak of an envelope specified based on a temporal change of the AE signal and a shaft vibration phase corresponding to a high spot position (for example, a high spot position Ph of the above embodiment) of the rotating part specified based on a temporal change of the shaft vibration signal in a case where rubbing occurs in the rotating machine.

According to the aspect of the above (10), the position in the circumferential direction where rubbing has occurred can be suitably identified based on the AE signals detected by a small number of AE sensors and the shaft vibration signal detected by the shaft vibration sensor. Since such identification of the position in the circumferential direction does not require complicated configuration or calculation and is not easily influenced by noise, it is possible to identify a rubbing position with high reliability even under various conditions.

REFERENCE SIGNS LIST

1: rotating machine
2: stationary part
3: supply system
4: rotating part
4a: rotor blade
5: discharge part
6a, 6b: bearing
7a, 7b: bearing box
10: AE sensor
20: shaft vibration sensor
30: calculation unit
32: rubbing determination unit
34: rubbing position identification unit
100: rubbing position identification device
D: clearance
Dh: normal direction
Fo: orbit chart
K: orbit
Lh: envelope
Ls: tangent line
Ph: high spot position

The invention claimed is:

1. A rubbing position identification device for a rotating machine that includes a fixed part and a rotating part, the device comprising:

at least one AE sensor for detecting an AE signal of the rotating machine;

at least one shaft vibration sensor for detecting a shaft vibration signal of the rotating part; and a rubbing position identification unit for identifying a position of a rubbing occurrence location of the rotating machine in a circumferential direction based on a difference between an AE phase corresponding to a peak of an envelope specified based on a temporal change of the AE signal and a shaft vibration phase corresponding to a high spot position of the rotating part specified based on a temporal change of the shaft vibration signal in a case where rubbing occurs in the rotating machine.

2. The rubbing position identification device for a rotating machine according to claim 1, wherein, when the position in the circumferential direction is $\varphi rub$, an attachment position of the shaft vibration sensor with respect to a reference position is $\varphi vib$, the AE phase is $\theta rub$, and the shaft vibration phase is $\theta vib$, the position in the circumferential direction $\varphi rub$ is expressed by the following expression:

$$\varphi rub = \varphi vib + (\theta rub - \theta vib).$$

3. The rubbing position identification device for a rotating machine according to claim 1, wherein the at least one shaft vibration sensor is configured to detect the shaft vibration signal having an amplitude corresponding to a size of a clearance present between the shaft vibration sensor and the rotating part installed at the fixed part, and the rubbing position identification unit specifies the high spot position based on a maximum peak included in a temporal change of the amplitude.

4. The rubbing position identification device for a rotating machine according to claim 1, wherein the at least one shaft vibration sensor includes a first shaft vibration sensor and a second shaft vibration sensor having attachment angles different from each other, and the rubbing position identification unit obtains an orbit of the high spot position based on the shaft vibration signals detected by the first shaft vibration sensor and the second shaft vibration sensor, and identifies the position in the circumferential direction based on the orbit and the AE phase.

5. The rubbing position identification device for a rotating machine according to claim 4, wherein the rubbing position identification unit identifies the position in the circumferential direction via a normal direction of a tangent line passing through a point corresponding to the AE phase and plotted on the orbit.

6. The rubbing position identification device for a rotating machine according to claim 1, wherein the at least one shaft vibration sensor includes a third shaft vibration sensor and a fourth shaft vibration sensor installed at positions different from each other in an axial direction, and the rubbing position identification unit calculates the position in the axial direction via linear interpolation of shaft vibration vectors based on the shaft vibration signals detected by the third shaft vibration sensor and the fourth shaft vibration sensor.

7. The rubbing position identification device for a rotating machine according to claim 1, wherein the at least one shaft vibration sensor includes a fifth shaft vibration sensor and a sixth shaft vibration sensor installed at positions different from each other in an axial direction, and the rubbing position identification unit identifies the position in the circumferential direction by obtaining a shaft vibration vector corresponding to the rubbing occurrence location as a linear sum of shaft vibration vectors corresponding to the fifth shaft vibration sensor and the sixth shaft vibration sensor, by using a coefficient that defines a vibration amplitude ratio between the fifth shaft vibration sensor, the sixth shaft vibration sensor, and the rubbing occurrence location for each vibration mode obtained in a mode analysis.

8. The rubbing position identification device for a rotating machine according to claim 1, wherein the shaft vibration sensor and the AE sensor are provided in bearing boxes in which bearings that rotatably support the rotating part with respect to a stationary part are housed.

9. The rubbing position identification device for a rotating machine according to claim 1, wherein the rotating machine is a steam turbine.

10. A rubbing position identification method for a rotating machine that includes a fixed part and a rotating part, the method comprising:

a step of detecting an AE signal of the rotating machine;

a step of detecting a shaft vibration signal of the rotating part; and a step of identifying a position of a rubbing occurrence location of the rotating machine in a circumferential direction based on a difference between an AE phase corresponding to a peak of an envelope specified based on a temporal change of the AE signal and a shaft vibration phase corresponding to a high spot position of the rotating part specified based on a temporal change of the shaft vibration signal in a case where rubbing occurs in the rotating machine.

* * * * *